United States Patent [19]

Reed, Jr.

[11] 4,083,635

[45] Apr. 11, 1978

[54] METHOD OF PRODUCING POSITIVE IDENTIFICATION CHECKS

[76] Inventor: Thomas K. Reed, Jr., P.O. Box 709, Albuquerque, N. Mex. 87103

[21] Appl. No.: 618,563

[22] Filed: Oct. 1, 1975

[51] Int. Cl.$^2$ ........................ G03B 27/32; G03B 27/44; G03B 27/70; G01D 9/42

[52] U.S. Cl. .................................. 355/77; 346/107 C; 355/43; 355/46; 355/66

[58] Field of Search ....................... 355/77, 72, 40, 43, 355/46, 54, 61, 66, 51; 346/107 C; 354/105, 120

[56] References Cited

U.S. PATENT DOCUMENTS

| | | | |
|---|---|---|---|
| 1,916,282 | 7/1933 | Peacock | 355/40 |
| 2,058,415 | 10/1936 | Chrétien | 355/46 |
| 2,206,206 | 7/1940 | Smith | 355/77 |
| 2,490,033 | 12/1949 | Current | 355/77 |
| 2,494,599 | 1/1950 | Weckbaugh | 355/43 |
| 2,830,512 | 4/1958 | Nagel | 346/107 C UX |
| 2,975,282 | 3/1961 | Schaffer | 346/107 C X |
| 3,042,920 | 7/1962 | Simjian | 346/107 C X |
| 3,628,430 | 12/1971 | Morse | 355/66 |
| 3,709,597 | 1/1973 | La Rocca | 355/61 |
| 3,775,007 | 11/1973 | Davidson | 354/105 X |
| 3,781,109 | 12/1973 | Mayer et al. | 355/46 X |
| 3,783,755 | 1/1974 | Lagin | 355/40 |
| 3,833,296 | 9/1974 | Vola et al. | 355/51 |
| 3,934,256 | 1/1976 | Isonaka | 355/72 X |

*Primary Examiner*—Donald Griffin
*Attorney, Agent, or Firm*—Christie, Parker & Hale

[57] ABSTRACT

A likeness and signature of the first negotiator of a check are imprinted on the check from a source of identifying information including the likeness and signature of one or more individuals. The source of information may be an identification card carried by each individual, and the imprinting step may be carried out by an office copying machine having a blank paper storage magazine, an exposure station that individually receives sheets of blank paper from the magazine, and a document receiving window from which a document image is projected onto the sheet received at the exposure station. The magazine is loaded with check forms each having a blank space for the likeness and signature of the first negotiator, the identification card is positioned on the document receiving window so the image projected from the card is in registration with the blank space on the check form sheet at the exposure station, and the machine is actuated to transfer the image projected from the card onto the blank space of the check form sheet. At least some of the identifying information imprinted on the check is recorded on a storage medium as a record of the transaction. The storage medium may comprise a non-negotiable record copy portion of the check form sheets on which the information is recorded with an office copying machine by projecting the likeness and signature of the first negotiator from an identification card through the document receiving window in duplicate onto the negotiable check portion and the non-negotiable record copy portion of the check form sheet at the exposure station.

11 Claims, 5 Drawing Figures

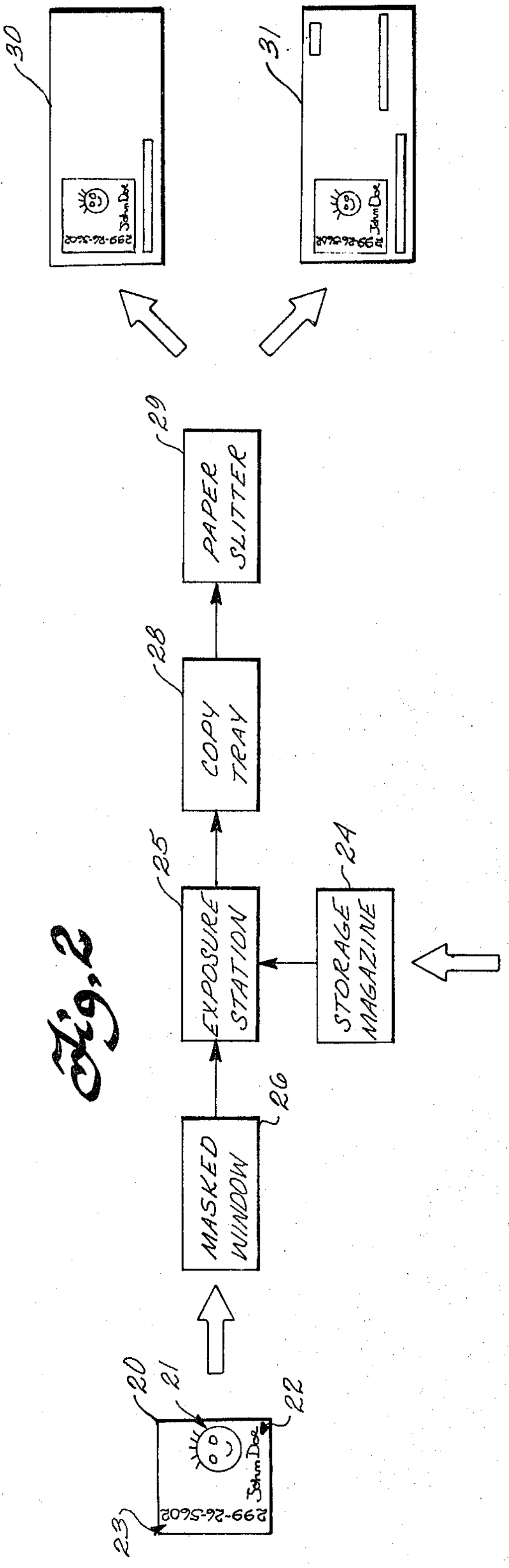
Fig. 2
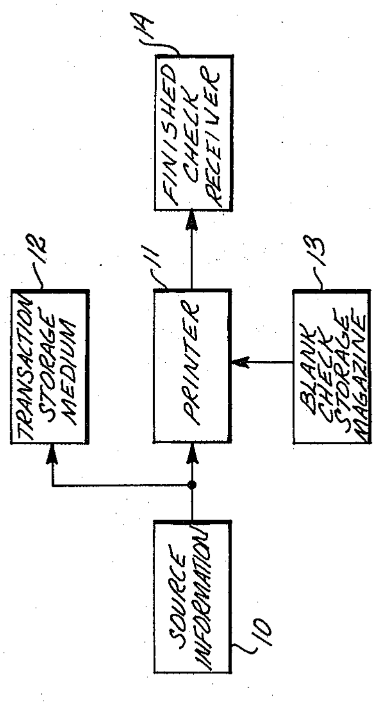
Fig. 1
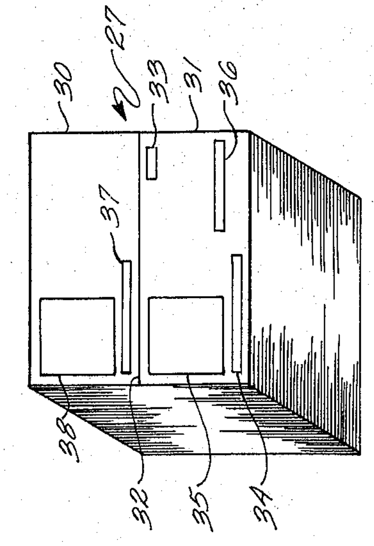

METHOD OF PRODUCING POSITIVE IDENTIFICATION CHECKS

BACKGROUND OF THE INVENTION

This invention relates to the production of checks designed to be readily acceptable by retail merchants and those furnishing personal services.

In recent years, the use of cash to pay for retail goods and personal services has been greatly reduced in favor of credit cards and personal checks, due to the danger of cash loss through theft and robbery and the difficulty of accounting for cash expenditures. A sizeable percentage of the population, however, do not hold credit cards and do not have checking accounts. These people generally cash periodic payroll, social security, or welfare checks at a bank, and then hold the currency until it is spent. Loss of such currency through theft or robbery is prevalent. Banks find it a burden to cash the payroll, social security, and welfare checks of non-account holders because of the risk of forgery and the processing expense.

Personal identification is a problem to credit card holders and first negotiators of checks. Merchants commonly demand some form of identification from a credit card holder before he may use his credit card to make purchases. Often, a merchant will not cash any checks, regardless of the extent of personal identification the first negotiator may furnish, due to the danger of forgery or insufficient funds in the account. Thus, even those who hold credit cards and have checking accounts and often forced to carry cash in order to purchase goods and services.

SUMMARY OF THE INVENTION

According to the invention, positive identification checks are produced on a sheet having a negotiable check portion and a non-negotiable record copy portion by imprinting on the check portion information identifying the first negotiator of the check, including the likeness and/or signature of the first negotiator, from a source of first negotiator identification information, including the likeness and/or signature, of one or more individuals, and by imprinting from the source on the record copy portion at least some of the identifying information imprinted on the check portion. The imprinted record copy portion is severed from the imprinted check portion, which is subsequently negotiated.

The invention contemplates that the amount of the check be determined before it is issued to the first negotiator. Therefore, the amount of the check is preferably printed in machine readable form in the check amount field for processing purposes at the same time or before the likeness of the first negotiator is imprinted on the check. This eliminates the necessity for a keyboard operator to perform this function when the cashed check is processed.

In the presently preferred embodiment, the source of first negotiator identifying information is an identification card carried by each individual, and the imprint on the check is made by an office copying machine having a blank paper storage magazine, a exposure station that individually receives sheets of blank paper from the magazine, and a document receiving window from which a document image is projected onto the sheet received at the exposure station. The magazine is loaded with check forms each having a blank space for the likeness and signature of the first negotiator, the identification card is positioned on the document receiving window so the image projected from the card is in registration with the blank space upon the check form sheet at the exposure station, and the machine is actuated to transfer the image projected from the card onto the blank space of the check form sheet. The storage medium is a non-negotiable record copy portion of the check form sheets on which the information is recorded by the office copying machine by projecting the likeness and signature of the first negotiator from the identification card through the document receiving window in duplicate onto the negotiable check portion and the non-negotiable record copy portion of the check form sheet at the exposure station.

The positive identification checks produced according to the presently preferred embodiment of the invention described above are designed for use by a first negotiator who is the drawer of the checks in the following way: a customer who is in possession of an identification card bearing his likeness and signature requests one or more checks of fixed denonmination from the teller at a bank; at the time of the request, the customer pays the teller cash in the aggregate amount of the value of the requested checks plus a service fee, and gives the teller his identification card; the teller produces on an office copying machine the requested number of checks with the likeness and signature of the customer who becomes the first negotiator of the check, and gives these positive identification checks to the first negotiator; payment of each check is guaranteed to its recipient or second negotiator by the issuing bank, when properly countersigned and identified with the likeness on the identification card within a restricted geographic area by the first negotiator of the check in the presence of the recipients or second negotiator of the checks; and the cashed checks are quickly returned to the issuing bank, i.e., by the next day, for reconciliation with the record copy portions. Thus, the recipient or second negotiator of the check can verify the identification of the first negotiator at the time the checks are countersigned and be assured that the funds for paying the checks are available; and the bank can quickly determine if improper use is being made of the checks.

Brief Description of the Drawings

The features of embodiments of the best mode contemplated of carrying out the invention are illustrated in the drawings, in which:

FIG. 1 is a schematic block diagram representing broadly the steps in the method for producing positive identification checks according to the principles of the invention;

FIG. 2 is a schematic block diagram representing the production of positive identification checks with an office copying machine;

Detailed Description of the Specific Embodiments

Figure 3:
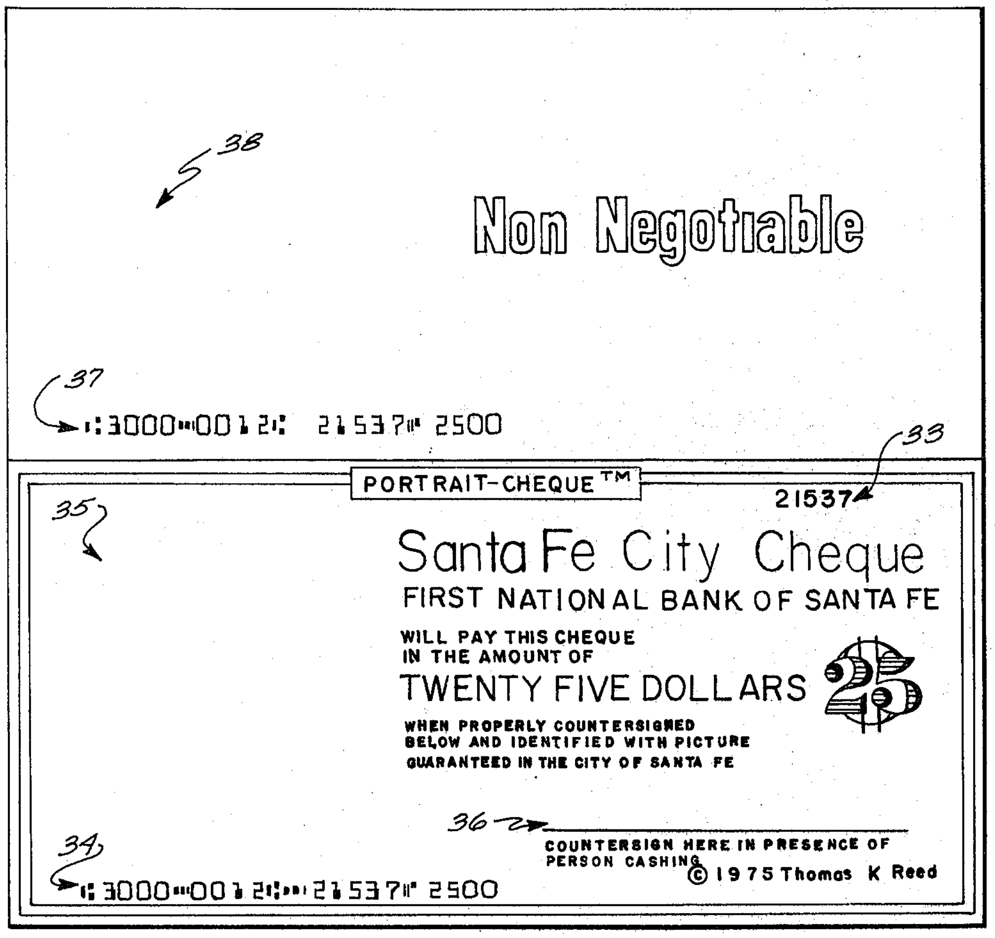
FIG. 3 is a detailed diagram of one of the blank check forms used in connection with FIG. 2.

In FIG. 1 a source of a first negotiator identifying information 10 is coupled to a printer 11 and a transaction storage medium 12. Paper from a blank check storage magazine 13 is fed to printer 11, which prints thereon information from source 10 and feeds the printed checks to a finished check receiver 14. To produce a positive identification check, printer 11 imprints on a check information identifying the first negotiator of the check, including the likeness and signature of the first negotiator, from source 10, and storage medium 12 records at least some of the identifying information of the first negotiator of the check from the source, such as the likeness and/or signature and/or an identification number.

In one embodiment of the invention, source 10 could comprise a digital computer having a main memory in which the first negotiator identification information of many individuals is stored and an image forming device that operates responsive to the digital output of the computer. Storage medium 12 could comprise a large scale, slow access memory device such as a disc file or magnetic tape, on which an identification number of the first negotiator is recorded along with the amount, date, and serial number of the check. Thus, the likeness and signature of the first negotiators, in this case payees, of automatically produced checks drawn by employers or government agencies in various amounts, such as payroll, social security, and welfare checks, appear on the checks, thereby insuring the identification of the first negotiator when he cashes the check. The amount of the check is also printed at this time in machine readable MICR form in the check amount field described below in connection with FIG. 2. Then the check is issued to the payee.

In another embodiment of the invention shown in FIG. 2, source 10 takes the form of an identification card 20 bearing a photographic likeness 21 and a signature 22 of an individual first check negotiator, in this case a check drawer. Identification card 20 also carries an identification number 23, such as a social number or other number that uniquely identifies the individual. Printer 11 takes the form of a conventional office copying machine having a blank paper storage magazine 24, an exposure station 25 that individually receives sheets of blank paper from magazine 24, and a masked document receiving window 26 from which a document image is projected onto the sheet received at exposure station 25. By way of example, the office copying machine could be a Xerox Model 3100. Magazine 24 is loaded with a stack of check form sheets 27.

As depicted in FIG. 3 each of check form sheets 27 comprises a non-negotiable record copy portion 30 and a negotiable check portion 31 having a dividing line 32, which could be perforated if desired for ease of separation. Check portion 31 designates in printed form a fixed denomination, e.g., $25.00, the issuer of the check, e.g., the First National Bank of Santa Fe, and the restricted geographic area in which the check may be cashed, e.g., the boundaries of the City of Santa Fe, New Mexico. A serial number unique to each check form sheet, e.g., 21537, is preprinted on an area 33 of check portion 31. Check portion 31 also has an area 34 where information is preprinted in machine readable, magnetic ink character recognition (MICR) form, a blank area 35 where the identification number, likeness, and signature of the first negotiator are to be imprinted when the fist negotiator purchases the check, and an area 36 where the check is to be countersigned by the drawer when he cashes the check. The format of area 34 is standardized for all checks throughout the entire banking industry. There are three fields, namely, the transit code field, the "bank on us" field, and the check amount field, reading from left to right. The transit code, i.e., 3000 0012, identifies the issuing bank uniquely as among all the banks in the United States, and thus permits the check to be machine sorted for return to the issuing bank. The unique serial number of the check, i.e., 21537, appears in the "bank on us" field. The denomination of the check, i.e., 2500, appears in the check amount field. (It should be noted that, in contrast to the invention, the check amount field is normally filled in by an MICR keyboard operator after the check has been cashed and is being processed by the receiving bank for return to the issuing bank, because the amount is not known when the check is printed.) Record copy portion 30 has an area 37 where the identical transit code, serial number, and denomination of the check are also preprinted in machine readable, MICR form at the same time as the information in area 34, and has a blank area 38 where the identification number, likeness, and signature of the first negotiator are to be imprinted when the first negotiator purchases the check.

The document receiving window is masked so the identification card can only be positioned on the window with the image projected from the card in registration with the blank space on the check form sheet at the exposure station. In this embodiment of the invention, identification card 20 is placed in a card holder of an optical system described below in connection with FIGS. 4A and 4B, which projects the likeness and signature of the first negotiator from identification card 20 in duplicate through window 26 in registration with blank areas 35 and 38 on check portion 31 and record copy portion 30, respectively. Thus, the masking function is performed by the optical system. However, in other embodiments, a single image could be projected from the identification card onto the check portion, the appropriate first negotiator identification information being recorded on the record copy portion by other means. In such case, a simple mask could be placed directly over window 26, leaving a blank space the size of identification card positioned so the image projected from the card is in registration with the blank space on the check portion of the check form sheet at the exposure station.

After identification card 20 is positioned on window 26, the copying machine is actuated to transfer the image projected from identification card 20, including likeness 21, signature 22, and identification number 23 onto blank space 35 of check portion 31 and blank space 38 of record copy portion 30.

The check form sheet onto which the first negotiator identifying information is transferred at exposure station 25 is delivered to a copy tray 28. A conventional commercially available paper slitter 29 receives the check form sheet from copy tray 28 and separates check portion 31 from record copy portion 30. Check portion 31 is given to the first negotiator and record copy portion 30 is retained as storage medium 12 in this embodiment.

The intended use of the checks produced in the manner described in connection with FIG. 2 is as follows: a customer who has been previously issued an identification card bearing his identification number, likeness, and signature requests one or more checks of fixed denomination from the teller at an issuing bank; at the time of the request, the customer pays the teller cash in the aggregate amount of the value of the requested checks plus a service fee, and gives the teller his identification card; the teller produces on an office copying machine, as described in connection with FIG. 2, the requested number of checks with the identification number, likeness, and signature of the customer, who becomes the drawer and first negotiator of the check, and gives these positive identification checks to the first negotiator. Payment of each check is guaranteed to its recipient by the issuing bank when properly countersigned within a restricted geographic area by the first negotiator of the check in the presence of the recipient of the check. Thus, the recipient or second negotiator of the check can verify the identification of the first negotiator at the time the check is countersigned and be assured that the funds for paying the check are available. It should be noted, the issuing bank has an incentive to cash the payroll, social security, or welfare check of the customer because of the service charge for the checks and the float, which may be a substantial amount of money. The danger of counterfeit or forged checks is minimized by the restricted geographic area of use of the checks, which permits quick reconciliation.

Figure 4A:
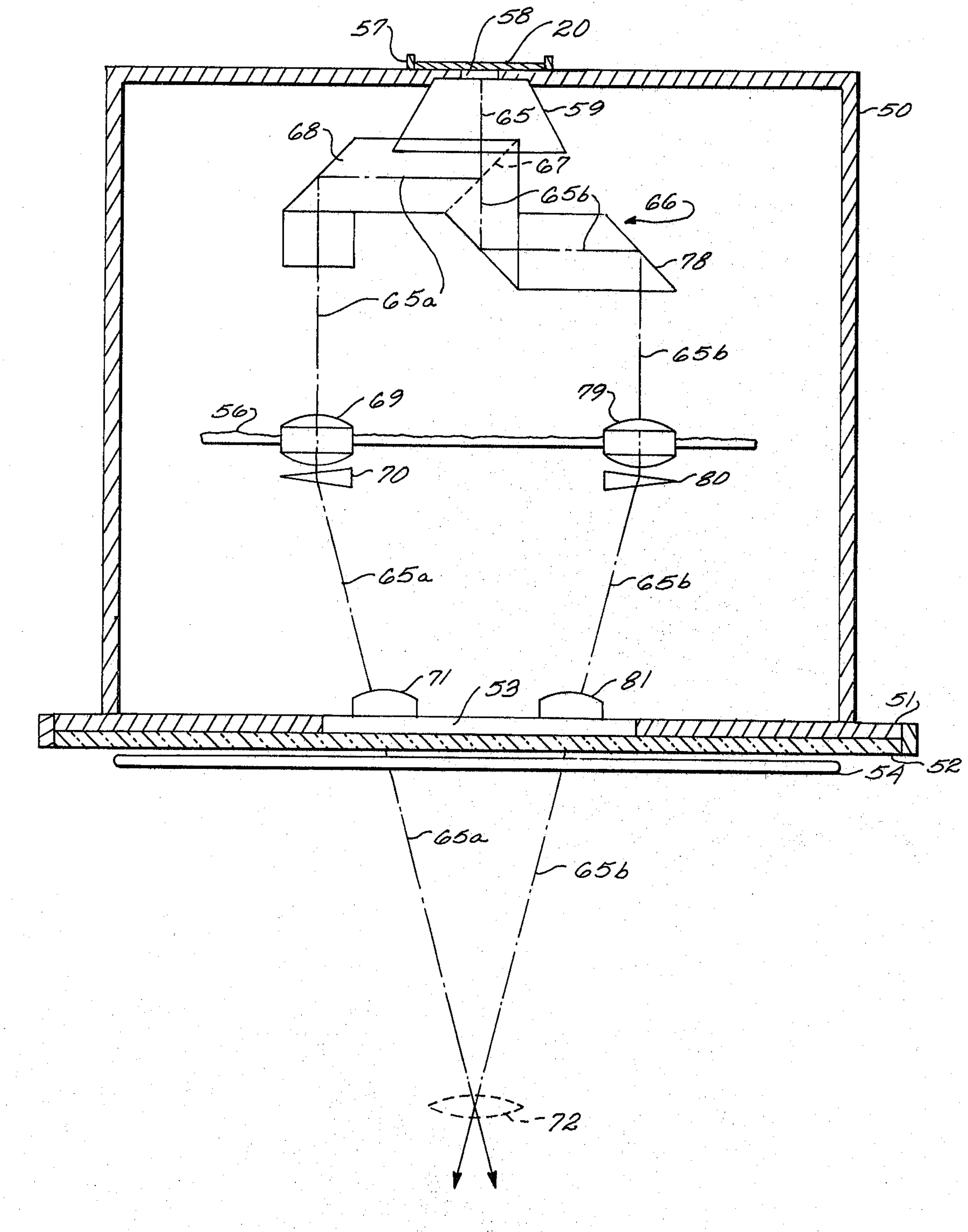
FIGS. 4A and 4B are front and side views, respectively, of a schematic representation of an optical system that projects an image in duplicate for use with an office copying machine.
Figure 4B:
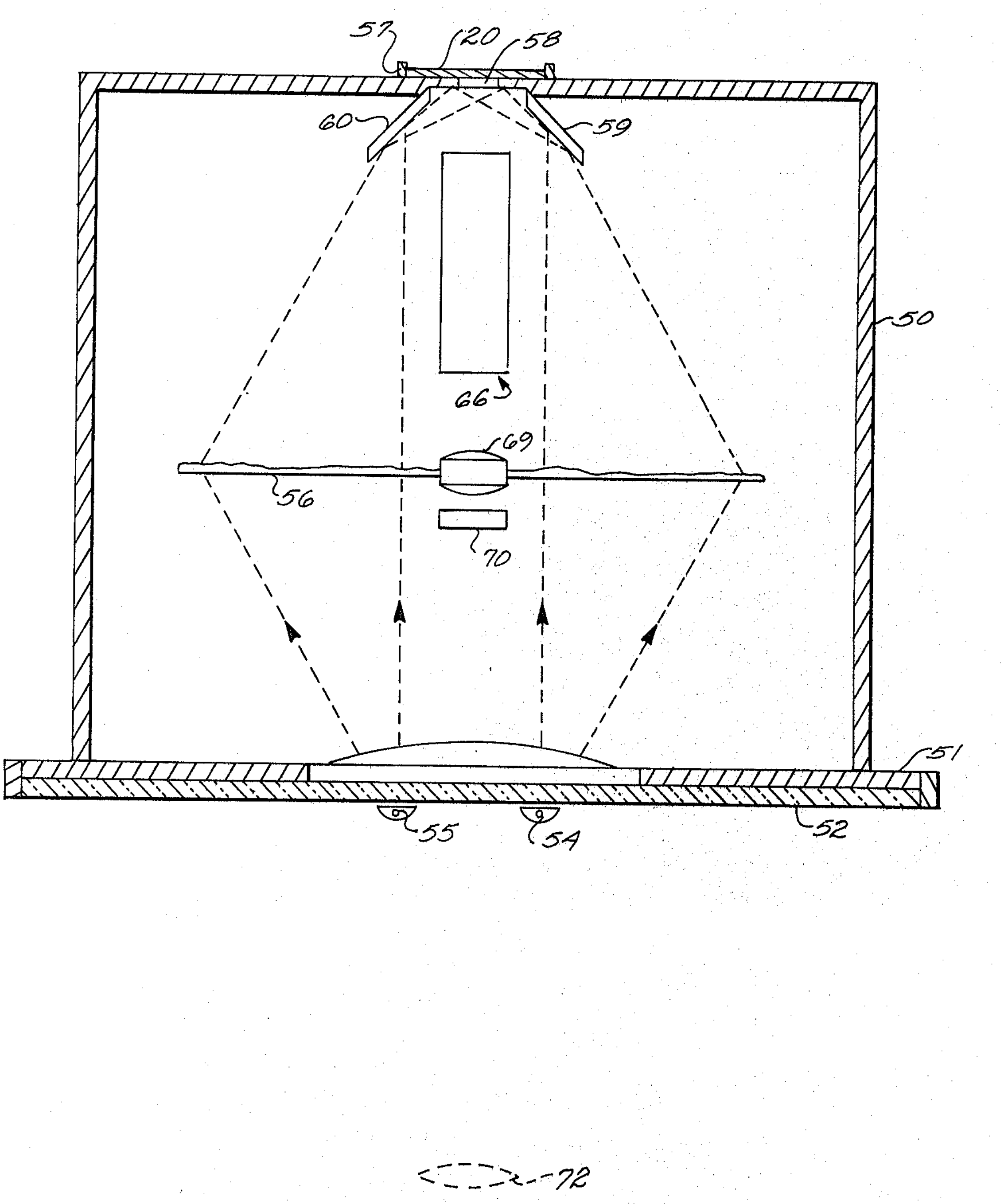

Reference is made to FIGS. 4A and 4B for a description of the optical system for projecting the image of an identification card in duplicate through the document receiving window of an office copying machine. The system has a housing 50, including a platen 51 identical in size and shape to document receiving window 52 of the office copying machine. Platen 51 serves as a mask and has an opening 53 that controls the boundaries of the projected image. Light from gas lamps 54 and 55 in the office copying machine passes through opening 53 and illuminates a Fresnel light collecting lens 56. Identification card 20 is placed in a holder 57 designed so the image on identification card 20, i.e., the likeness, signature, and identification number, is in registration with an opening 58 in housing 50. The light from lamps 54 and 55 is directed by lens 56 onto the surface of the image on identification card 20 via a front surface mirror 59 and a rear surface mirror 60. The illuminated image traverses a path designated 65 into a beam splitting prism cluster 66. At a partially reflective surface 67 of cluster 66, the beam of the image is divided to follow two separate paths designated 65*a* and 65*b*. One beam following path 65*a* is reflected at a surface 68 of cluster 66 and passes through a camera lens 69, a thin wedged prism 70, and a field lens 71 to scanning lens 72 of the copying machine. The other light beam following path 65*b* is reflected from a surface 78 of cluster 66 through a camera lens 79, a thin wedged prism 80, and a field lens 81 to scanning lens 72. Camera lenses 69 and 79 and field lenses 71 and 81 are designed to produce a focused full size replica of the image from identification card 20 in duplicate at the surface of window 52. This image passes through scanning lens 72 to the exposure station of the copying machine in the same manner as a document laid directly on window 52. Similarly, gas lamps 54 and 55 illuminate identification card 20 in the same manner as though it were lying directly on window 52. The movement of lamps 54 and 55 is coordinated to that of lens 72 to provide the proper light scan. In summary, there is provided a passive optical system that projects the image from an identification card onto the window of an office copying machine in duplicate; the system is so positioned that the duplicate images projected from the card are in registration with the blank spaces on the check portion and record copy portion of the check form sheet at the exposure station of the copying machine.

The described embodiments of the invention are only considered to be preferred and illustrative of the inventive concept; the scope of the invention is not to be restricted to such embodiments. Various and numerous other arrangements may be devised by one skilled in the art without departing from the spirit and scope of this invention.

What is claimed is:

1. A method of producing positive identification checks from sheets having a negotiable check portion and a non-negotiable record copy portion, the method comprising simultaneously the steps of:

imprinting on the check portion information identifying the first negotiator of the check, including the likeness and signature of the negotiator, from a source of first negotiator identifying information, including the likeness and signature, of one or more individuals;

imprinting from the source on the record copy portion at least some of the identifying information imprinted on the check portion; and severing the imprinted record copy portion from the imprinted check portion.

2. The method of claim 1, in which the source of identifying information comprises an identification card bearing the likeness and signature of the first negotiator, and the step of imprinting on the check portion comprises actuating an office copying machine having a blank paper storage magazine into which sheets each having a check portion with a blank space for the likeness and signature are loaded and a document receiving window on which the identification card is placed prior to actuation.

3. The method of claim 2, in which the check portion of the sheets each have a check amount field on which a check amount is printed in machine readable form.

4. The method of claim 1, additionally comprising the step of imprinting on the check portion from the source an identification number unique to the first negotiator.

5. The method of claim 1, in which the step of imprinting on the record copy portion comprises imprinting the likeness and the signature of the first negotiator on the record copy portion.

6. The method of claim 5, in which the source of identifying information comprises an identification card bearing the likeness and signature of the first negotiator, and the step of imprinting on the check portion comprises actuating an office copying machine having a blank paper storage magazine into which sheets each having a check portion with a blank space for the likeness and signature are loaded and a document receiving window on which the identification card is placed prior to actuation.

7. The method of claim 6, in which the step of imprinting on the check portion additionally comprises imprinting the amount of the check thereon in machine readable form.

8. The method of claim 5, in which the step of imprinting on the check portion additionally comprises imprinting the amount of the check thereon in machine readable form.

9. The method of claim 1, in which the step of imprinting on the check portion additionally comprises imprinting the amount of the check thereon in machine readable form.

10. A method for producing positive identification checks with an office copying machine having a blank paper storage magazine, an exposure station that individually receives sheets of blank paper from the magazine, and a document receiving window from which a document image is projected onto the sheet received at the exposure station, the method comprising the steps of:

loading the magazine with check form sheets each having a negotiable check portion, a nonnegotiable record copy portion, and a blank space for the likeness of the first negotiator in each portion;

positioning an identification card bearing the likeness of the first negotiator on the document receiving window;

projecting the image from the identification card through the document receiving window in duplicate onto the blank spaces of the negotiable check portion and the nonnegotiable copy portion of the check form sheet at the exposure station; and actuating the machine to transfer the projected image onto said blank spaces of the check form sheet at the exposure station.

11. The method of claim 10, in which a transit code, a unique serial number, and a check amount are printed in MICR form on each check form loaded in the magazine.

* * * * *